United States Patent [19]

Watanabe

[11] Patent Number: 5,753,881
[45] Date of Patent: May 19, 1998

[54] METHOD AND APPARATUS FOR ROTATING A MACHINING PORTION OF AN ELECTRODISCHARGE MACHINE

[75] Inventor: Kazuo Watanabe, Annaka, Japan

[73] Assignee: Okamoto Machine Tool Works, Ltd., Kanagawa, Japan

[21] Appl. No.: 611,789

[22] Filed: Mar. 6, 1996

[30] Foreign Application Priority Data

Mar. 10, 1995 [JP] Japan ................................ 7-050702

[51] Int. Cl.⁶ ........................ B23H 1/00; B23H 1/10
[52] U.S. Cl. ........................ 219/69.14; 219/69.15
[58] Field of Search ................ 219/69.14, 69.15, 219/69.17; 205/651, 665, 686

[56] References Cited

U.S. PATENT DOCUMENTS 3,711,676  1/1973  Witzel .................... 219/69.14

FOREIGN PATENT DOCUMENTS

| 62-4527 | 1/1987 | Japan . | |
| 62-251017 | 10/1987 | Japan | 219/69.14 |
| 1 22094 | 4/1989 | Japan . | |
| 1-289616 | 11/1989 | Japan | 219/69.14 |
| 3 47972 | 7/1991 | Japan . | |
| 4-35815 | 2/1992 | Japan | 219/69.14 |
| 1825677 | 7/1993 | Russian Federation | 219/69.14 |

*Primary Examiner*—Geoffrey S. Evans
*Attorney, Agent, or Firm*—Oblon, Spivak, McClelland, Maier & Neustadt, P.C.

[57] ABSTRACT

A method for rotating a machining portion of an electrodischarge machine, in which a tool electrode holder mounted to a clamp holder to hold a tool electrode is rotated by virtue of a reaction force induced by the jet of a machining fluid to thereby rotate the tool electrode with respect to a workpiece. More specifically, the machining fluid is allowed to flow in the interior of the tool electrode holder and is conducted toward the outer peripheral surface of the tool electrode holder, then is further conducted in an inclined direction relative to the radial direction from the outer peripheral surface of the tool electrode holder and is jetted. Thus, the tool electrode holder is rotated by the force of reaction based on the jet of the machining fluid.

17 Claims, 9 Drawing Sheets

METHOD AND APPARATUS FOR ROTATING A MACHINING PORTION OF AN ELECTRODISCHARGE MACHINE

BACKGROUND OF THE INVENTION

1. Field of the Invention

The present invention relates to a method and apparatus for rotating a machining portion of an electrodischarge machine wherein a tool electrode and a workpiece are opposed to each other and the workpiece is machined in a desired form by electric discharge between the tool electrode and the workpiece under rotation of the tool electrode.

2. Description of the Prior Art

Generally, either a wire cutting method or an engraving method is adopted as an electrodischarge method of machining a workpiece in a desired shape by electric discharge between a tool electrode and the workpiece which are disposed oppositely to each other. According to these methods, the tool electrode or the workpiece is rotated for the purpose of improving the chip discharging performance, shortening the machining time and improving the machining accuracy. And according to apparatus used for those methods, a tool electrode holder or a workpiece holder is mounted rotatably and is rotated by means of an electric motor or an air motor.

However, such conventional methods involve the following problems. In the conventional driving method for rotation, an electric motor or an air motor is needed as a drive source, but it is difficult to install the motor at the axis of rotation, so there is adopted a method wherein the drive source and the tool electrode holder or the workpiece holder are connected together through a belt. Besides, it is necessary to separately provide, for example, an electric power supply or an air pump for moving the electric motor or the air motor, thus resulting in increase in size and weight of the apparatus. And the cost of the apparatus inevitably becomes high. Additionally, at the time of change-over between the case where it is not necessary to rotate the tool electrode holder or the workpiece holder and the case where the rotation is required, it is necessary to perform a preparatory operation which is troublesome.

SUMMARY OF THE INVENTION

It is an object of the present invention to provide a method and apparatus for rotating a machining portion of an electrodischarge machine which apparatus can be reduced in both size and weight.

It is another object of the present invention to provide a method and apparatus for rotating a machining portion of an electrodischarge machine which apparatus can be manufactured less expensively.

It is a further object of the present invention to provide a method and apparatus for rotating a machining portion of an electrodischarge machine which method and apparatus permit the preparatory operation to be performed in an efficient manner.

In one aspect of the present invention there is provided a method for rotating a machining portion of an electrodischarge machine, comprising the steps of: allowing a machining fluid to flow through the interior of a rotatable, tool electrode holder for holding a tool electrode, the tool electrode holder being mounted to a clamp holder; conducting the machining fluid flowing through the interior of the tool electrode holder toward the outer peripheral surface of the tool electrode holder; further conducting the machining fluid which has been conducted toward the outer peripheral surface of the tool electrode holder in a direction inclined relative to the radial direction from the outer peripheral surface and shooting a jet of the machining fluid; and causing the tool electrode holder to rotate together with the tool electrode by the jet of the machining fluid from the outer peripheral surface of the tool electrode holder. Consequently, a driving force for the tool electrode is obtained without the need of any special drive source such as an electric motor, and at the same time the machining fluid present near the tool electrode is agitated by virtue of the fluid jet.

In another aspect of the present invention there is provided an apparatus for rotating a machining portion of an electrodischarge machine, comprising: a rotatable, tool electrode holder mounted to a clamp holder of the electrodischarge machine to hold a tool electrode; a machining fluid passage hole formed in the interior of the tool electrode holder and communicating with a machining fluid supply side, thereby allowing a machining fluid to flow therethrough; a communication hole branching from the machining fluid passage hole to conduct the machining fluid toward the outer peripheral surface of the tool electrode holder; and an ejection hole which provides communication of the communication hole with the outer peripheral surface of the tool electrode holder and which directs a jet of the machining fluid toward an inclined direction relative to the radial direction from the outer peripheral surface of the tool electrode holder. This construction permits formation of a rotating portion extremely reduced in both size and weight.

In a further aspect of the present invention there is provided a method for rotating a machining portion of an electrodischarge machine, comprising the steps of: allowing a machining fluid to flow through the interior of a workpiece holder mounted rotatably onto a table to hold a workpiece, the table being disposed opposedly to the tip of a tool electrode; conducting the machining fluid flowing through the interior of the workpiece holder toward the outer peripheral surface of the workpiece holder; further conducting the machining fluid which has been conducted toward the outer peripheral surface of the workpiece holder in an inclined direction relative to the radial direction from the outer peripheral surface of the workpiece holder and shooting a jet of the machining fluid; and causing the workpiece holder to rotate together with the tool electrode by the jet of the machining fluid from the outer peripheral surface of the workpiece holder. According to this construction, a driving force for the workpiece can be obtained without the need of any special drive source such as an electric motor, and at the same time the whole of the machining fluid is agitated.

In a still further aspect of the present invention there is provided an apparatus for rotating a machining portion of an electrodischarge machine, comprising: a workpiece holder mounted rotatably onto a table to hold a workpiece, the table being disposed opposedly to the tip of a tool electrode; a machining fluid passage hole formed in the interior of the workpiece holder and communicating with a machining fluid supply side, thereby allowing a machining fluid to flow therethrough; a communication hole branching from the machining fluid passage hole to conduct the machining fluid toward the outer peripheral surface of the workpiece holder; and an ejection hole which provides communication of the communication hole with the outer peripheral surface of the workpiece holder and which directs a jet of the machining fluid in an inclined direction relative to the radial direction from the outer peripheral surface of the workpiece holder. According to this construction it is possible to form a rotating portion in extremely reduced size and weight.

DETAILED DESCRIPTION OF THE PREFERRED EMBODIMENTS

The first embodiment of the present invention will be described below with reference to the accompanying drawings.

Figure 1:
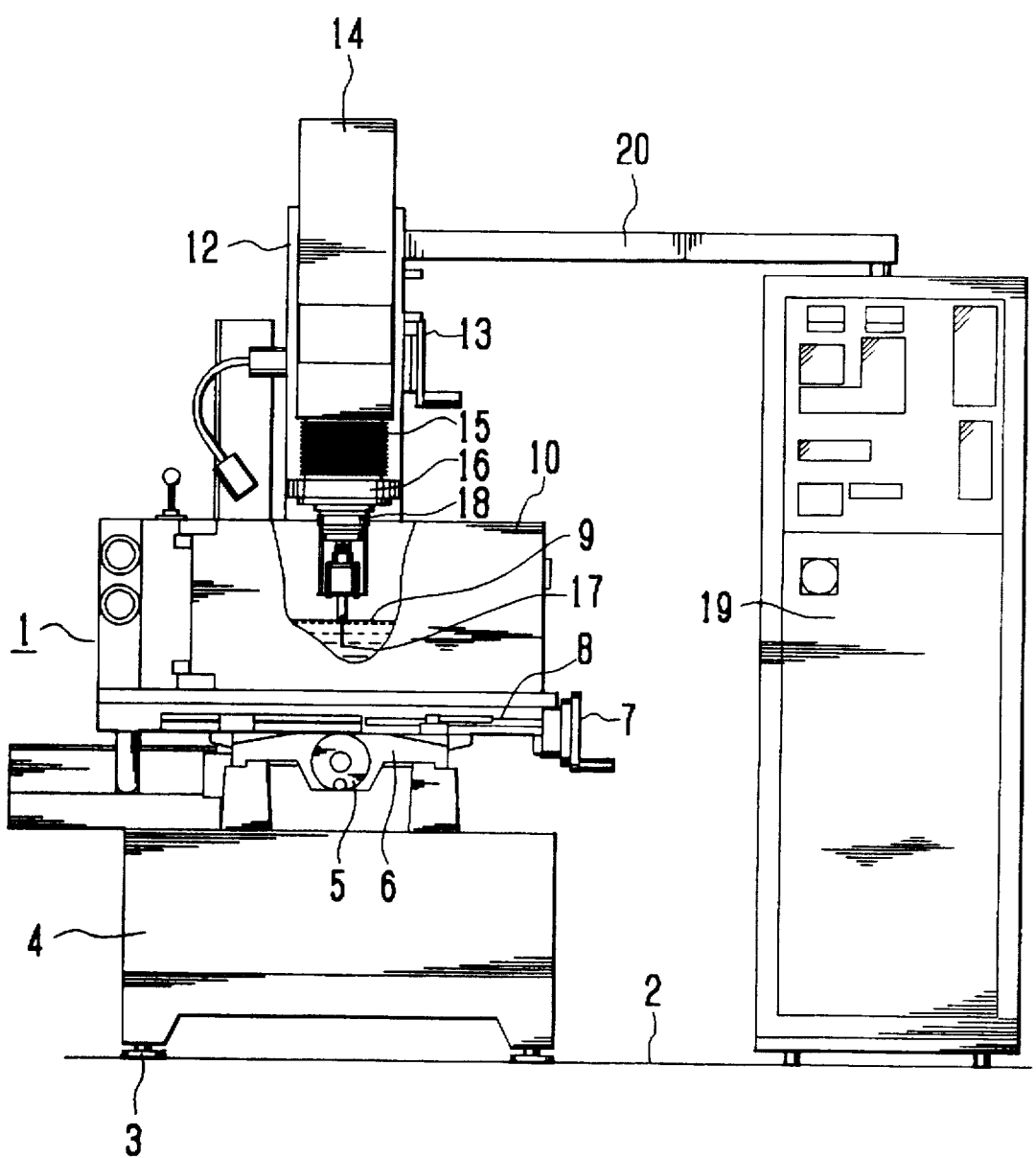
FIG. 1 is a front view of an electrodischarge machine according to the first embodiment of the present invention.
Figure 2:
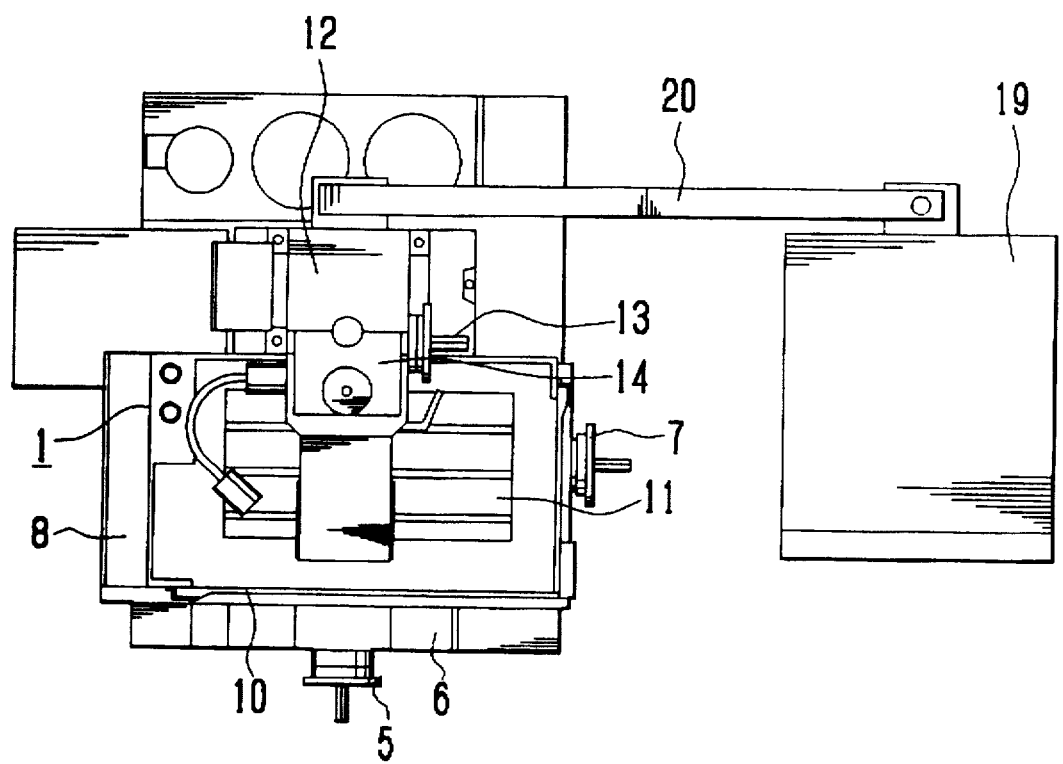
FIG. 2 is a plan view thereof.
Figure 3:
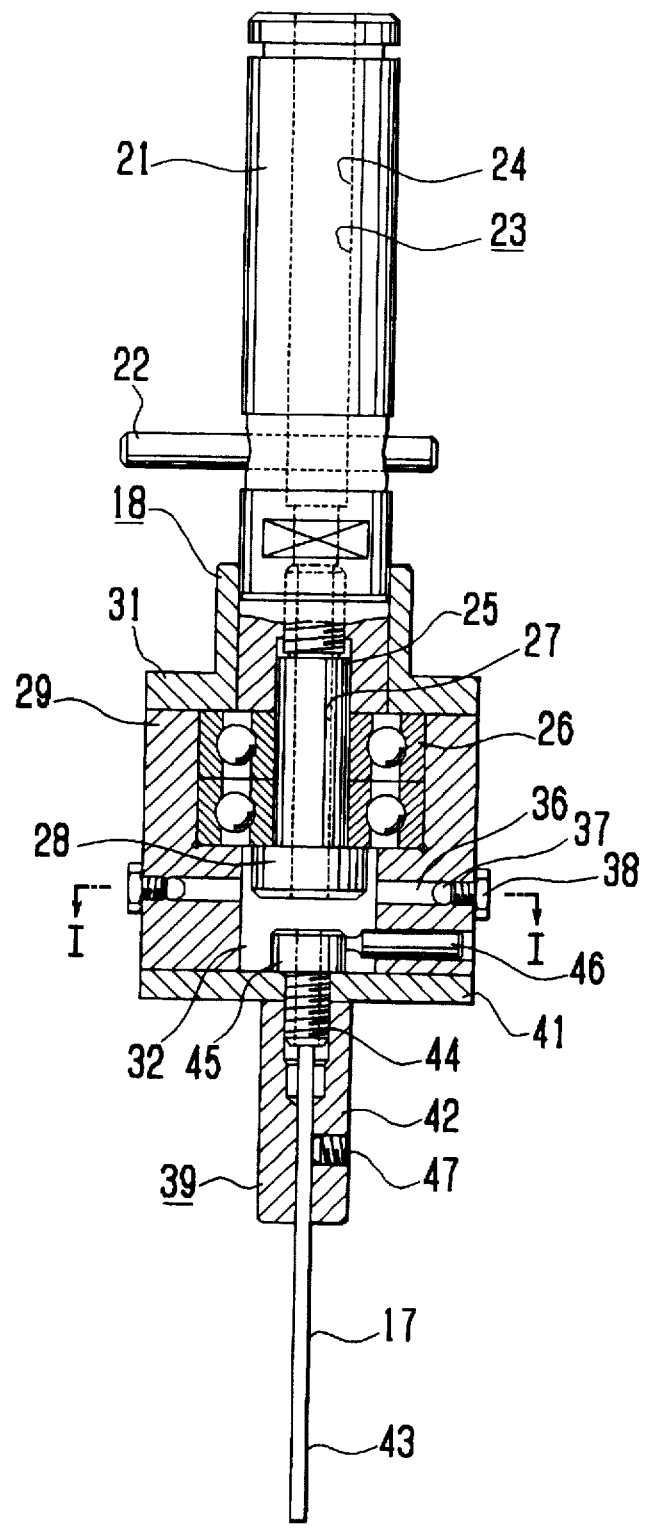
FIG. 3 is a partially cut-away front view of a tool electrode holder used in the electrodischarge machine.
Figure 4:
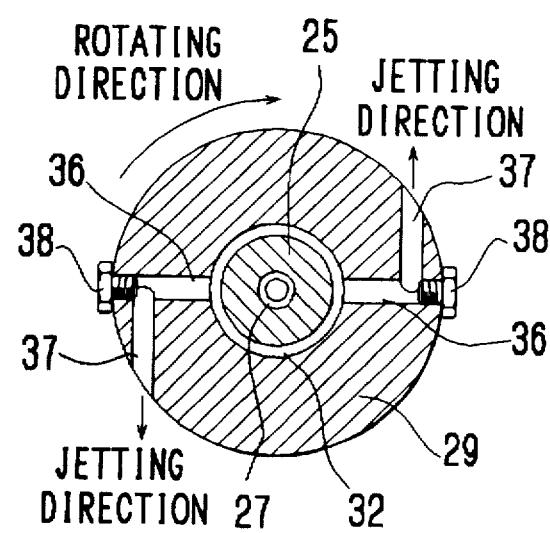
FIG. 4 is a sectional view taken on line I—I in FIG. 3.
Figure 5:
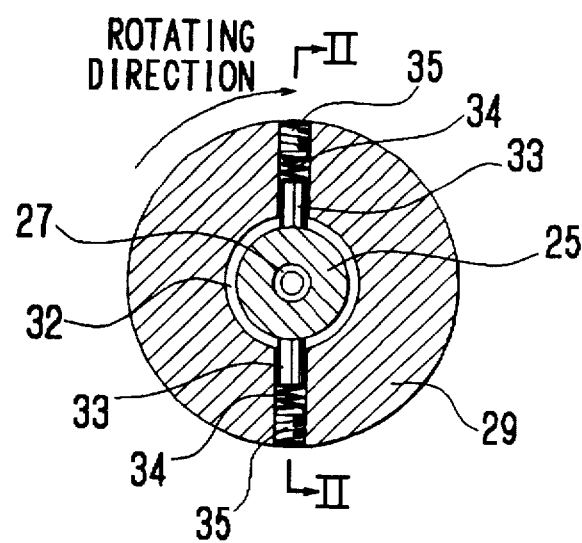
FIG. 5 is a plan view, in horizontal section, of the portion slightly above the line I—I in FIG. 3.
Figure 6:
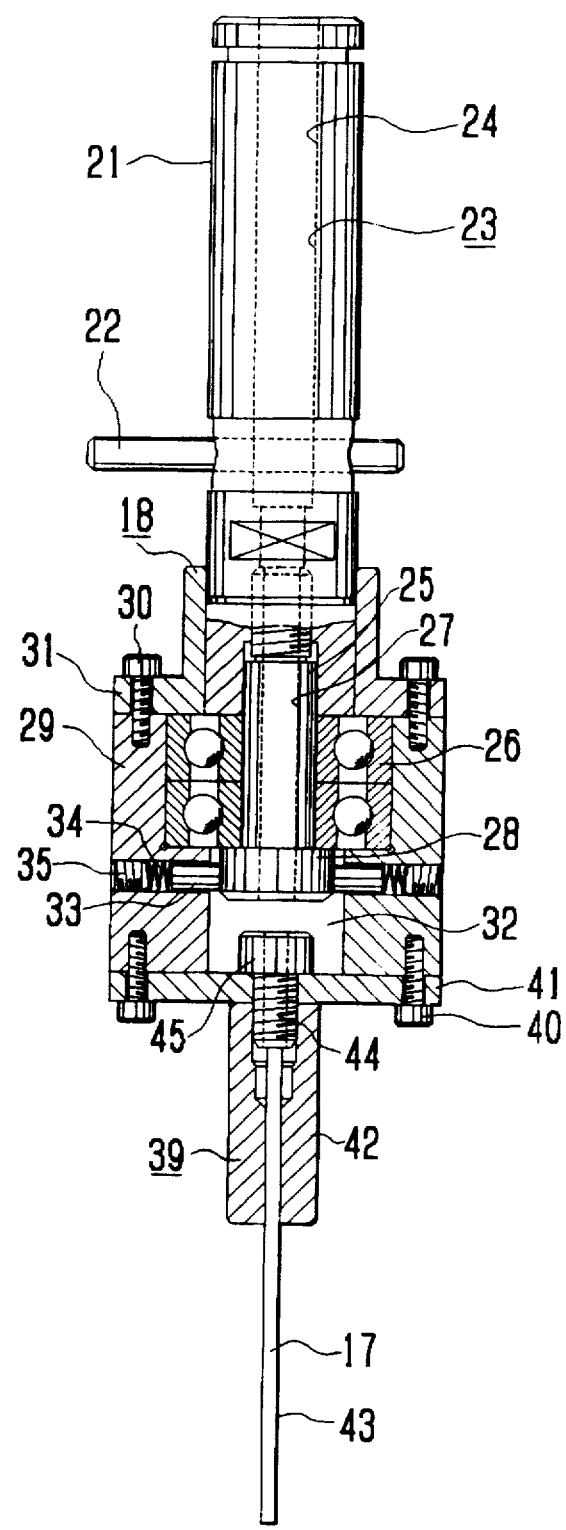
FIG. 6 is a sectional view taken on line II–II in FIG. 5.

Referring to FIGS. 1 and 2, the structure of an electrodischarge machine 1 will now be described. The electrodischarge machine 1 itself is of a conventional structure. More specifically, a base 4 is disposed on an installment floor 2 through height adjusting legs 3, and on the base 4 is mounted a saddle 6 capable of being moved in the longitudinal direction by turning a handle 5. Further, on top of the saddle 6 is mounted a table 8 capable of being moved in the transverse direction by turning a handle 7, and over the upper surface of the table 8 is mounted a box-shaped, machining fluid tank 10 which is open upward to store a machining fluid 9 therein. In the interior of the machining fluid tank 10 is provided a workpiece holder 11 for holding a workpiece. Within the machining fluid tank 10 it is necessary that the machining fluid 9 be present up to a level of at least 50 mm above the workpiece. On a rear portion of the table 8 is erected a column 12, to which is mounted a lift member 14 capable of being moved up and down by operating a handle 13. Under the lift member 14 is provided a clamp holder 16, which is connected to the lift member through bellows 15, and under the clamp holder 16 is removably provided a tool electrode holder 18, to which is attached a tool electrode 17 selectively. Further, a control panel box 19 is installed sideways. The control panel box 19 and the electrodischarge machine 1 are electrically connected with each other through a connecting member 20. Both ends of the connecting member 20 are pivotable each other to permit a positional adjustment of the control panel box 19 as necessary.

The structure of the tool electrode holder 18 will now be described with reference to FIGS. 3 to 6. A shank 21 is provided which is to be inserted into the clamp holder 16, with a cross pin 22 being fixed perpendicularly to the shank 21 to restrict the insertion depth of the shank. In the shank 21 is formed a central hole 24 through the axis of the shank, which central hole constitutes a machining fluid passage hole 23. To the lower end of the shank 21 are attached two bearings 26 through a connecting bolt 25. Centrally of the connecting bolt 25 is formed a central through hole 27 as a constituent of the machining fluid passage hole 23. The outer periphery of the head portion of the connecting bolt 25 serves as a slide surface 28 for the supply of electric power. A housing 29 is fitted over the outer peripheries of the bearings 26. Axial dislodgement of the housing 29 is prevented by means of a bearing presser member 31 which is connected to the housing with bolts 30. Centrally under the housing 29 is formed a space 32 which receives therein the head portion of the connecting bolt 25 and which is in communication with the machining fluid passage hole 23. In the housing 29 and around the electric power supplying slide surface 28 there are arranged in symmetric positions two metallic pieces 33 for the supply of electric power, which pieces 33 are brought into pressure contact with the slide surface 28 slidably by means of worm screws 35 through coiled springs 34. Further, through holes 36 extend through the center of the space portion 32 of the housing 29, and two ejection holes 37 are formed in directions opposite to each other. The ejection holes 37 are perpendicularly in communication with the communication holes 36 and are open circumferentially at the periphery of the housing 29. To prevent scatter of the fluid jet from the surface of the machining fluid 9, the ejection holes 37 somewhat face downward. A jet flow adjusting screw 38 is fitted in the outer peripheral end of each communication hole 36. The adjusting screw 38 extends up to the portion where the associated ejection hole 37 opens into the communication hole 36, and functions to adjust the amount of the machining fluid 9 to be ejected. To the lower end of the housing 29 is mounted an electrode mounting member 39 removably with bolts 40. The electrode mounting member 39 comprises an electrode mounting plate 41 attached to the housing 29 and a cylindrical portion 42 fixed to the central part of the electrode mounting plate 41. Further, a tool electrode 17 is mounted removably through the center of the electrode mounting plate 41 and that of the cylindrical portion 42. The tool electrode 17 comprises an elongated machining portion 43 formed to a predetermined outside diameter, a threaded portion 44 threadedly engaged with the electrode mounting member 39, and a head portion 45 positioned within the space 32. The whole of the tool electrode 17 is hollow for communication with the space 32. An electrode rotation center adjusting screw 46, which is in abutment with a side face of the head portion 45, is threadedly connected to the housing 29. Further, a tool electrode presser screw 47 is mounted in the cylindrical portion 42.

Figure 7:
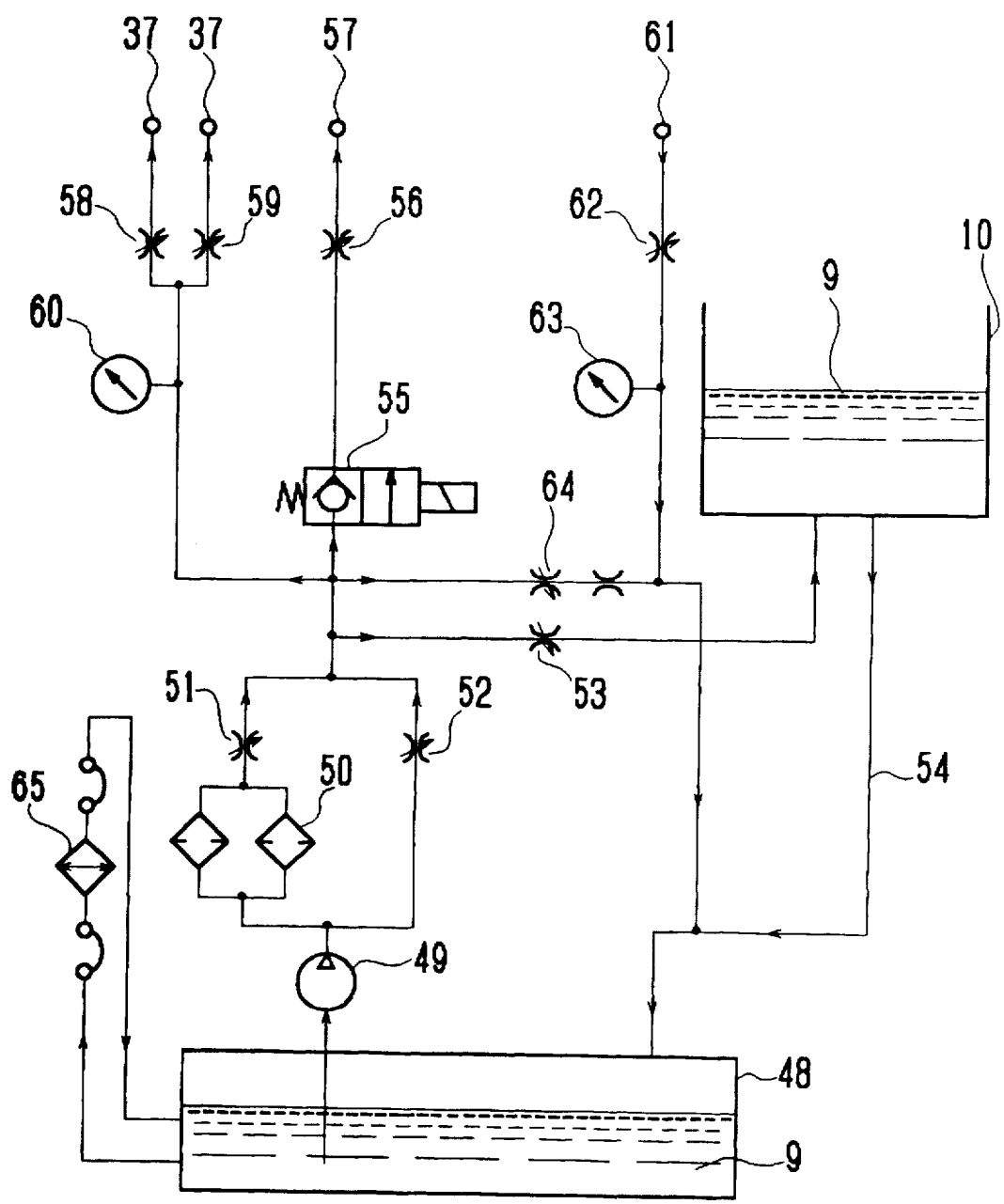
FIG. 7 is a circuit diagram of a machining fluid supply path.

Referring now to FIG. 7, a machining fluid circuit will be described. There is provided a machining fluid tank 48 which contains machining fluid 9. Connected to the machining fluid tank 48 is a machining fluid supply pump 49, to which are connected in parallel both a change-over valve 51 through a filter 50 and a change-over valve 52 directly. To the change-over valves 51 and 52 is connected the foregoing machining fluid tank 10 through a machining fluid fill rate adjusting knob 53. The tank 10 is also connected to the machining fluid tank 48 through a drain 54. To the change-over valves 51 and 52 is also connected a solenoid valve 55, to which is connected a pulse circuit 57 through a valve 56, the pulse circuit 57 functioning to feed the lift member 14 with pulses. Further, two ejection holes 37 are connected to the change-over valves 51 and 52 through valves 58 and 59 (jet flow adjusting screw 38). Also connected to this circuit portion is a pressure gauge 60. On the other hand, for the supply of the machining fluid 9, a suction circuit 61 is connected to the machining fluid tank 48 through a valve 62 and a pressure gauge 63. The change-over valves 51 and 52 are further connected through a suction valve 64 to a junction of the suction circuit 61 and the machining fluid tank 48. Additionally, a machining fluid cooling device 65 is connected as a special attachment to the tank 48.

To carry out electric discharge machining in such a construction, a workpiece is loaded to the workpiece holder 11, and the tool electrode holder 18 which holds the tool electrode 17 necessary for the machining is mounted to the clamp holder 16. Then, machining conditions such as peak current value, gap voltage, jump time, feed rate, machining time, pulse ON time and pulse OFF time are set by panel operation in the control panel box 19. During electric discharge machining, the machining fluid supply pump 49 is in operation, and the level of the machining fluid 9 in the machining fluid tank 10 is kept constant by a level control means (not shown). The machining fluid 9 is fed under pressure into the space 32 through the machining fluid passage hole 23 of the tool electrode holder 18, then passes through the interior of the tool electrode 17 and is jetted from the tip of the machining portion 43 to remove chips which are produced during machining, for example.

The machining fluid 9 flows from the space 32 through the communication holes 36 and is jetted from the ejection holes 37. Since the fluid jet direction is in the circumferential direction of the housing 29, the housing undergoes a rotational force induced by the reaction of the fluid jet, so that the housing held by the bearings 26, as well as the bearing presser member 31 and the tool electrode 17, rotate integrally. At this time, since the machining fluid 9 is jetted in directions opposite to each other from the two ejection holes 37, there is attained a more efficient rotation of the housing 29, bearing presser member 31 and tool electrode 17. As a result, the machining portion 43 of the tool electrode 17 rotate relative to the workpiece and is wasted uniformly. Further, the jet of the machining fluid 9 from the housing 29 agitates the machining fluid 9 contained in the machining fluid tank 10. This agitation creates an additional agitating force for a preset state of fluid agitation in the tank 10, thus contributing to the improvement in the chip discharge performance, shortening of the machining time and improvement in the machining accuracy.

In this way the tool electrode 17 is rotated by utilizing the machining fluid 9 required for machining. All that is required for attaining this function is merely mounting the housing 29 rotatably and forming the machining fluid ejection holes 37 circumferentially in the housing 29. Thus, not only the structure is simple but also the entire apparatus is small in both size and weight. Besides, the replacement of the tool electrode 17 is easy.

In machining, an electrical connection to the tool electrode 17 is effected through the shank 21. Since the shank 21 and the connecting bolt 25 are metallic, they are good electric conductors. The supply of electric power is made between the power supplying slide surface 28 formed at the head portion of the connecting bolt 25 and the power supplying piece 33, and a voltage is applied to the tool electrode 17 via the power supplying piece 33, housing 29 and electrode mounting member 39. Therefore, even upon rotation of the housing 29 which holds the tool electrode 17, the voltage from the fixed shank 21 flows through the connecting bolt 25 provided with the power supplying slide surface 28 and further through the power supplying piece 33 and is applied to the tool electrode 17.

Although in the above embodiment the tool electrode 17 is adapted to rotate, a rotating member may be provided in the workpiece holder 11 and ejection holes which open in the circumferential direction may be formed in the rotating member to feed the machining fluid 9 under pressure. In this case, the workpiece rotates at the time of machining, and it is optional whether the tool electrode 17 side is to be fixed in the rotational direction or to be rotated.

Figure 10:
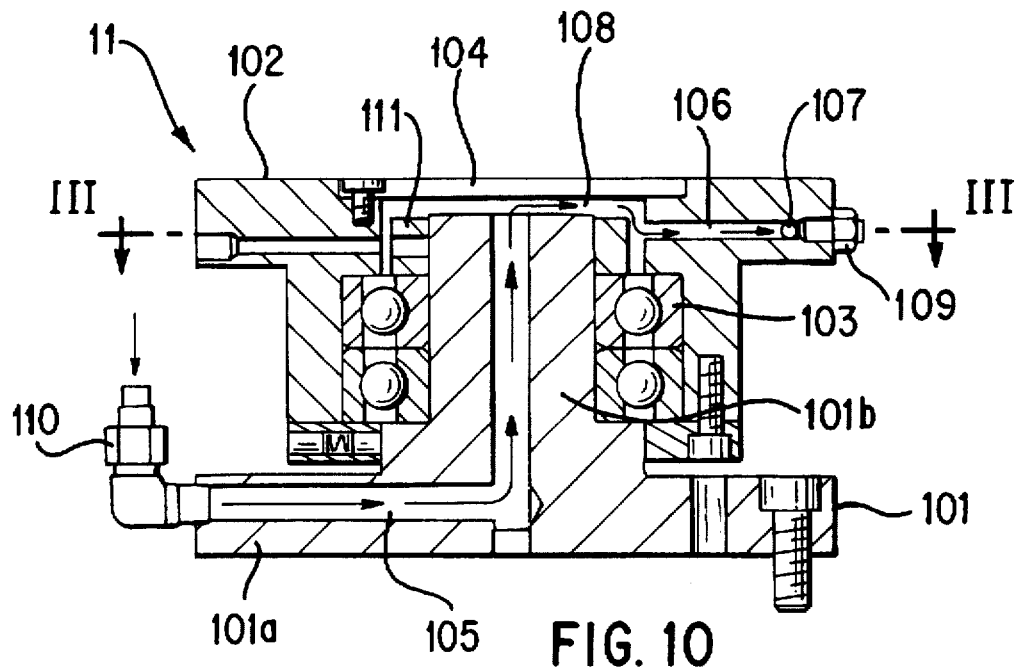
FIG. 10 is a cut-away front view of a workpiece holder.
Figure 11:
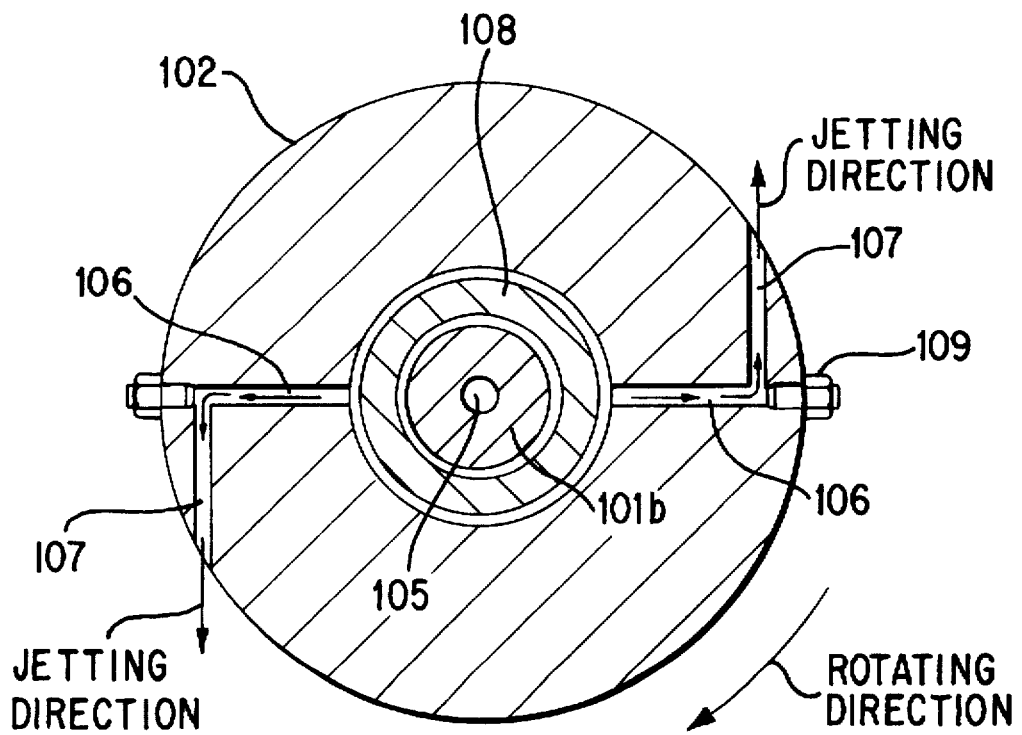
FIG. 11 is a sectional view taken on line III—III in FIG. 10.

FIGS. 10–11 show an example of this modification. FIG. 10 is a cut-way front view of the workpiece holder. FIG. 11 is a sectional view taken on line III—III in FIG. 10. As shown in FIG. 10, the workpiece holder 11 comprises a body 101 and a rotating member 102. The body 101 is formed by a disk-like portion 101a and an axis portion 101b provided on the disk-like portion 101a perpendicularly. Two ring bearings 103 are mounted on the axis portion 101b and are locked by a lock nut 111 which is screwed around the axis portion 101b. The rotating member 102 is rotatably mounted on the axis portion 101b of the body 101 by bearings 103. The rotating member 102 includes a table 104 for attaching the workpiece. The table 104 is kept horizontal even though the rotating member 102 rotates. The workpiece holder 11 includes machining fluid passage hole 105, two communication holes 106 and two ejecting holes 107 in the interior. The machining fluid passage hole 105 is formed in the interior of the body 101 and penetrates the body 101 from the side lower surface of the disk-like portion 101a to the upper surface of the axis portion 101b. The machining fluid passage hole 105 extends to the communication holes 106 and the ejecting holes 107 provided in the interior of the rotating member 102 through the space 108 between the axis portion 101b of the body 101 and the rotating member 102. As shown in FIG. 11, the ejecting holes 107 are perpendicularly in communication with the communication holes 106 and are open circumferentially at the periphery of the rotating member 102. A jet flow adjusting screw 109 is fitted in the outer peripheral end of each communication hole 106.

In operation, the machining fluid is supplied from a connecting pipe 110 connected to the machining fluid passage hole 105 at the periphery of the disk-like portion 101a of the body 101. Then, the machining fluid flows from the machining fluid passage hole 105 and the space 108 through the communication holes 106 and is jetted from the ejection holes 107. Since the fluid jet direction is in the circumferential direction of the rotating member 102, the rotating member 102 undergoes a rotational force induced by the reaction of the fluid jet, so that the rotating member 102 held by the bearing 103 rotates. At this time, since the machining fluid is jetted in directions opposite to each other from the two ejection holes 107, there is attained a more efficient rotation of the rotating member 102. As a result, the workpiece attached on the rotating member 102 also rotates.

Figure 8:
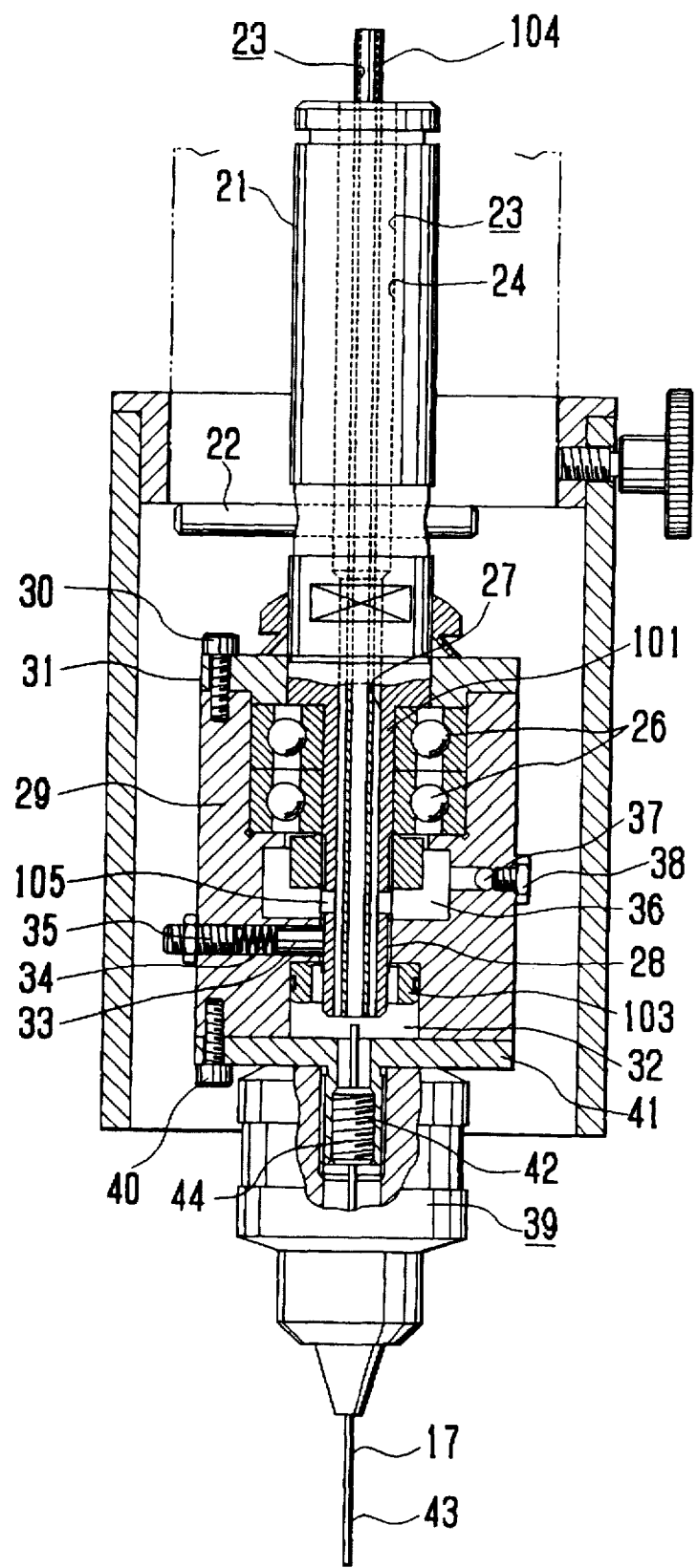
FIG. 8 is a partially cut-away, front view of a tool electrode holder used in the second embodiment of the present invention.
Figure 9:
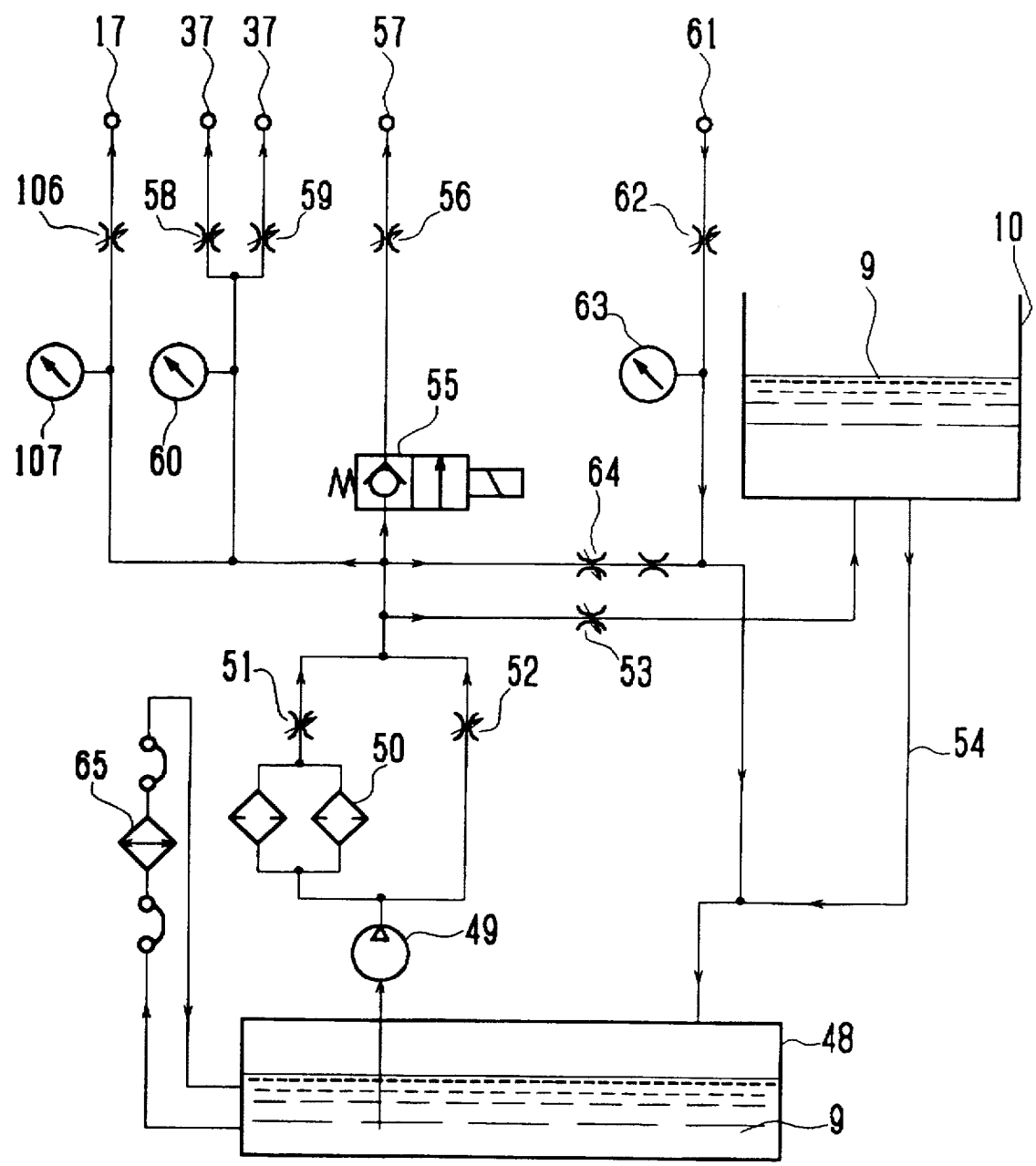
FIG. 9 is a circuit diagram of a machining fluid supply path.

The second embodiment of the present invention will now be described with reference to FIGS. 8 and 9. In this embodiment, machining fluid passage holes 23 are formed in two systems, one being for a tool electrode 17 and the other for ejection holes 37. The other constructional points are basically the same as in the first embodiment. Therefore, the same portions as in the first embodiment are indicated by the same reference numerals as in the first embodiment and explanations thereof will be omitted.

First, the structure of a tool electrode holder 18 will be described with reference to FIG. 8. A central hole 24 which constitutes a machining fluid passage hole 23 is formed through the axis of a shank 21, the shank 21 being inserted into a clamp holder 16. The shank 21 is formed with a bearing mounting portion 101, and two bearings 26 are clamped and fixed to the bearing mounting portion 101 with a lock nut 102. The outer periphery of the lower end portion of the shank 21 is formed as a slide surface 28 for the supply of electric power. A housing 29 is fitted over the outer peripheries of the bearings 26, and axial dislodgement of the housing 29 is prevented by means of a bearing presser member 31 which is connected to the housing through bolts 30. In the lower central portion of the housing 29 is formed a space 32, into which is projecting the lower end portion of the shank 21, with a seal member 103 being fixed to the lower end portion of the shank 21. Around the power supplying slide surface 28, two metallic power supplying pieces 33 are disposed in symmetric positions. The power supplying pieces 33 are slidably kept in pressure contact with the power supplying slide face 28 by means of worm screws 35 through coiled springs 34.

In the shank 21, a machining fluid pipe 104 provided internally with a machining fluid passage hole 23 separate from that formed by the central hole 24 of the shank is disposed within the central hole 24. The machining fluid passage hole 23 formed within the machining fluid pipe 104 is in communication with the space 32 formed centrally under the housing 29.

In the shank 21 is also formed a through hole 105 which extends through the central hole 24 in a position lower than the portion clamped by the lock nut 102. In the housing 29 are formed two communication holes 36 in communication with the through hole 105 and two ejection holes 37 in communication with the communication holes 36. The ejection holes 37 communicate perpendicularly with the communication holes 36 and are open in the circumferential direction at the outer periphery of the housing 29 so as to be opposite to each other. To prevent scatter of the fluid jet from the surface of the machining fluid 9, the ejection holes 37 face somewhat downward. A jet flow adjusting screw 38 is fitted in the outer peripheral end portion of each communication hole 36. The adjusting screw 38 extends up to the portion where the associated ejection hole 37 opens into the communication hole 36, and functions to adjust the amount of the machining fluid 9 to be ejected.

Thus, in the tool electrode holder 18 are formed two systems of machining fluid passage holes 23 one of which is formed by the central hole 24 of the shank 21 and communicating with the tool electrode 17 and the other formed within the machining fluid pipe 104 and communicating with the ejection holes 37, the holes 23 being completely divided and shut off with respect to each other.

A machining fluid circuit will be described with reference to FIG. 9. To change-over valves 51 and 52 is connected a tool electrode 17 through a valve 106 and in parallel with two ejection holes 37. A pressure gauge 107 is also connected to this circuit portion.

In this construction, the machining fluid 9 is supplied to the tool electrode 17 and ejection holes 37 through the separate systems of machining fluid passage holes 23. At this time, the amount of the machining fluid 9 to be fed to the tool electrode and that to the ejection holes 37 can be independently adjusted by means of the valve 106 and the valves 58, 59, respectively. Accordingly, a desired rotating speed, which rotation is based on the ejection of the machining fluid 9 from the ejection holes 37, can be set independently of the amount of the machining fluid 9 fed to the tool electrode 17.

As many apparently widely different embodiments of this invention may be made without departing from the spirit and scope thereof, it is to be understood that the invention is not limited to the specific embodiments thereof except as defined in the appended claims.

What is claimed is:

1. A method for rotating a machining portion of an electrodischarge machine, comprising the steps of:
    allowing a machining fluid to flow through the interior of a rotatable, tool electrode holder for holding a tool electrode, said tool electrode holder being mounted to a clamp holder;
    conducting the machining fluid flowing through the interior of said tool electrode holder toward an outer peripheral surface of the tool electrode holder;
    further conducting the machining fluid which has been conducted toward the outer peripheral surface of the tool electrode holder in a direction inclined relative to the radial direction from said outer peripheral surface and shooting a jet of the machining fluid; and
    causing said tool electrode holder to rotate together with said tool electrode by the jet of the machining fluid from the outer peripheral surface of the tool electrode holder.

2. A method as recited in claim 1, wherein the machining fluid is jetted from plural positions at the outer peripheral surface of said tool electrode holder.

3. A method as recited in claim 2, wherein the jets of the machining fluid are inclined in the same direction relative to the radial direction of said tool electrode holder.

4. A method as recited in claim 2, wherein the machining fluid jet positions at the outer peripheral surface of said tool electrode holder are symmetric with respect to the axis of the tool electrode holder, and in said symmetric positions the jets of the machining fluid are in opposite directions to each other.

5. A method as recited in claim 1, wherein the jet direction of the machining fluid is inclined at an angle of about 45 degrees relative to the radial direction of said tool electrode holder.

6. A method as recited in claim 1, wherein the machining fluid flowing through the interior of said tool electrode holder is conducted to said tool electrode.

7. A method as recited in claim 6, wherein the flow path of the machining fluid flowing through the interior of said tool electrode holder is divided into two independent paths one of which is a path for ejecting the machining fluid from the outer peripheral surface of the tool electrode holder and the other of which is a path for said tool electrode.

8. An apparatus for rotating a machining portion of an electrodischarge machine, comprising:
    a rotatable, tool electrode holder mounted to a clamp holder of the electrodischarge machine to hold a tool electrode;
    a machining fluid passage hole formed in the interior of said tool electrode holder and communicating with a machining fluid supply side, thereby allowing a machining fluid to flow therethrough;
    a communication hole branching from said machining fluid passage hole to conduct the machining fluid toward the outer peripheral surface of said tool electrode holder; and
    an ejection hole which provides communication of said communication hole with an outer peripheral surface of said tool electrode holder and which directs a jet of the machining fluid in an inclined direction relative to the radial direction from the outer peripheral surface of the tool electrode holder.

9. An apparatus as recited in claim 8, wherein said ejection hole is formed in a plural number.

10. An apparatus as recited in claim 9, wherein the jets of the machining fluid are inclined in the same direction relative to the radial direction of said tool electrode holder.

11. An apparatus as recited in claim 9, wherein the ejection holes are located in symmetric positions with respect to the axis of said tool electrode holder, and the jets of the machining fluid from the ejection holes located in said symmetric positions are in opposite directions to each other.

12. An apparatus as recited in claim 8, wherein the jet direction of the machining fluid is inclined at an angle of about 45 degrees relative to the radial direction of said tool electrode holder.

13. An apparatus as recited in claim 8, wherein said machining fluid passage hole is in communication with the interior of said tool electrode.

14. An apparatus as recited in claim 13, wherein said machining fluid passage hole is divided into two independent paths one of which is a path communicating with said ejection hole and the other of which is a path communicating with said tool electrode.

15. An apparatus as recited in claim 8, wherein said machining fluid passage hole is in communication with the machining fluid supply side at a connection with said clamp holder.

16. A method for rotating a machining portion of an electrodischarge machine, comprising the steps of:

allowing a machining fluid to flow through the interior of a workpiece holder mounted rotatably on a table to hold a workpiece, said table being disposed in opposition to the tip of a tool electrode;

conducting the machining fluid flowing through the interior of said workpiece holder toward an outer peripheral surface of the workpiece holder;

further conducting the machining fluid which has been conducted toward the outer peripheral surface of said workpiece holder in an inclined direction relative to the radial direction from the outer peripheral surface of the workpiece holder and shooting a jet of the machining fluid; and causing said workpiece holder to rotate together with said tool electrode by the jet of the machining fluid from the outer peripheral surface of the workpiece holder.

17. An apparatus for rotating a machining portion of an electrodischarge machine, comprising:

a workpiece holder mounted rotatably on a table to hold a workpiece, said table being disposed in opposition to the tip of a tool electrode;

a machining fluid passage hole formed in the interior of said workpiece holder and communicating with a machining fluid supply side, thereby allowing a machining fluid to flow therethrough;

a communication hole branching from said machining fluid passage hole to conduct the machining fluid toward an outer peripheral surface of said workpiece holder; and an ejection hole which provides communication of said communication hole with the outer peripheral surface of said workpiece holder and which directs a jet of the machining fluid in an inclined direction relative to the radial direction from the outer peripheral surface of the workpiece holder.

* * * * *